United States Patent
Myers et al.

(10) Patent No.: US 8,275,313 B1
(45) Date of Patent: Sep. 25, 2012

(54) LONG RANGE, LOW POWER, MESH NETWORKING WITHOUT CONCURRENT TIMING

(75) Inventors: Chris Myers, Littleton, CO (US); Leo John Staarmann, Boulder, CO (US); David Jansen, Louisville, CO (US); Patrick French, Littleton, CO (US)

(73) Assignee: Advanced Distributed Sensor Systems, Littleton, CO (US)

( * ) Notice: Subject to any disclaimer, the term of this patent is extended or adjusted under 35 U.S.C. 154(b) by 1258 days.

(21) Appl. No.: 12/014,509

(22) Filed: Jan. 15, 2008

Related U.S. Application Data

(60) Provisional application No. 60/884,966, filed on Jan. 15, 2007.

(51) Int. Cl.
*H04B 7/00* (2006.01)
(52) U.S. Cl. .............. 455/41.2; 455/412.2; 455/517; 455/3.05; 370/235; 370/400; 702/91
(58) Field of Classification Search .............. 455/41.2, 455/412.1, 412.2, 514, 517, 509, 518, 519, 455/550.1, 3.05; 370/235, 254, 400; 702/91
See application file for complete search history.

(56) References Cited

U.S. PATENT DOCUMENTS

| | | |
|---|---|---|
| 4,313,345 A | 2/1982 | Abele |
| 4,360,345 A | 11/1982 | Hon |
| 4,530,069 A | 7/1985 | Desrochers |
| 4,654,818 A | 3/1987 | Wetterau, Jr. |
| 4,695,955 A | 9/1987 | Faisandier |
| 4,715,385 A | 12/1987 | Cudahy et al. |
| 4,730,247 A | 3/1988 | Takahara |
| 4,758,963 A | 7/1988 | Gordon et al. |
| 4,811,249 A | 3/1989 | Marsh |
| 4,885,707 A | 12/1989 | Nichol et al. |
| 4,895,161 A | 1/1990 | Cudahy et al. |

(Continued)

FOREIGN PATENT DOCUMENTS

WO WO/96/01411 1/1996

OTHER PUBLICATIONS

Barnett et al; "Determination of Parts-per-Trillion Levels of Chlorate, Bromate, and Iodate by Electrospray Ionization/High-Field Asymmetric Waveform Ion Mobility Spectrometry/Mass Spectrometry;" Applied Spectroscopy; (1999), vol. 53, No. 11; pp. 1367-1374.

(Continued)

*Primary Examiner* — Shaima Q Aminzay
(74) *Attorney, Agent, or Firm* — Sheridan Ross P.C.

(57) ABSTRACT

In one embodiment, a first sensor node 100 includes a radio to effect wireless communications; a sensor module 204 to sense a selected parameter; and a scheduler 228 that selects a listen time for the first sensor node, such that, during the listen time, the radio is activated and able to receive wireless signals and, during a time other than the listen time, the radio is deactivated and unable to receive wireless signals, and causes transmission to a second sensor node a first message. The first message includes a time offset from a transmission time of the first message, the time offset indicating a timing of a first listen time for the first sensor node. In response, the node 100 receives, from the second sensor node, a second message, with the time selected by the second sensor node to transmit the second message to the first sensor node being based on the time offset.

13 Claims, 14 Drawing Sheets

U.S. PATENT DOCUMENTS

| | | | |
|---|---|---|---|
| 4,916,441 | A | 4/1990 | Gombrich |
| 4,924,418 | A | 5/1990 | Bachman et al. |
| 5,008,843 | A | 4/1991 | Poelsler et al. |
| 5,089,979 | A | 2/1992 | McEachern et al. |
| 5,099,437 | A | 3/1992 | Weber |
| 5,202,817 | A | 4/1993 | Koenck et al. |
| 5,206,818 | A | 4/1993 | Speranza |
| 5,225,996 | A | 7/1993 | Weber |
| 5,227,988 | A | 7/1993 | Sasaki et al. |
| 5,249,863 | A | 10/1993 | Brown |
| 5,347,476 | A | 9/1994 | McBean, Sr. |
| 5,357,795 | A | 10/1994 | Djorup |
| 5,375,604 | A | 12/1994 | Kelly et al. |
| 5,420,424 | A | 5/1995 | Carnhan et al. |
| 5,509,295 | A | 4/1996 | Bartoli |
| 5,526,287 | A | 6/1996 | French |
| H1688 | H | 11/1997 | Lake et al. |
| 5,714,691 | A | 2/1998 | Hill |
| 5,783,745 | A | 7/1998 | Bergman |
| 5,839,094 | A | 11/1998 | French |
| 5,920,827 | A | 7/1999 | Baer et al. |
| 6,097,703 | A | 8/2000 | Larsen et al. |
| 6,924,748 | B2 | 8/2005 | Obradovich et al. |
| 7,114,388 | B1 | 10/2006 | French et al. |
| 7,143,980 | B2 | 12/2006 | Heller et al. |

OTHER PUBLICATIONS

Carter et al.; "Emergence of Real Casualties During Simulated Chemical Warfare Training Under High Heat Conditions;" Military Medicine; (Dec. 1985), vol. 150, No. 12; pp. 657-663.

Carnahan et al.; "Field Ion Spectrometry—A New Analytical Technology for Trace Gas Analysis;" ISA; (1996), Paper #96-009; pp. 87-96.

Cole; "Heat Stroke During Training with Nuclear, Biological, and Chemical Protective Clothing: Case Report;" Military Medicine, (Jul. 1983), vol. 148; pp. 624-625.

DeVol et al.; "Isotopic Analysis of Plutonium Using a Combination of Alpha and Internal Conversion Electron Spectroscopy", Journal of Radioanalytical and Nuclear Chemistry; (2002), vol. 254, No. 1; pp. 71-79.

DeVol et al.; "Extractive Scintillating Resin for $^{99}$Tc Quantification in Aqueous Solutions" Journal of Radioanalytical and Nuclear Chemistry, (2001), vol. 249, No. 1; pp. 181-189.

Guevremont et al.; "Atmospheric Pressure Ion Focusing in a High-Field Asymmetric Waveform Ion Mobility Spectrometer;" Review of Scientific Instruments; (Feb. 1999), vol. 70, No. 2; pp. 1370-1383.

Guevremont et al.; "High Field Asymmetric Waveform Ion Mobility Spectrometry-Mass Spectrometry: An Investigation of Leucine Enkephalin Ions Produced by Electrospray Ionization;" American Society for Mass Spectrometry; (1999), vol. 10; pp. 492-501.

Guevremont et al.; "Ion Trapping at Atmospheric Pressure (760 Torr) and Room Temperature with a High-Field Asymmetric Waveform Ion Mobility Spectrometer;" Elsevier Science, International Journal of Mass Spectrometry; (1999), vol. 193; pp. 45-56.

Hughes et al.; "On-line Gross Alpha Radiation Monitoring of Natural Waters with Extractive Scintillating Resins" Elsevier Science, Nuclear Instruments and Methods in Physics Research, Section A, (2003) 505; pp. 435-438.

Matthew et al., "Integration of a Heat Strain Prediction Model with Army Weather Data Resources;" U.S. Army Research Institute of Environmental Medicine, (date unknown), pp. 479-485.

Matthew et al., "Integration of Weather Effects Models with Real-Time Physiological Measurements in the Dismounted Infantry Battlespace;" U.S. Army Research Institute of Environmental Medicine; (date unknown), pp. 653-660.

Miller et al., "A MEMS Radio-Frequency Ion Mobility Spectrometer for Chemical Vapor Detection;" Elsevier Science, Sensors and Actuators, Section A; (2001), 91; pp. 307-318.

Purves et al.; "Electrospray Ionization High-Field Asymmetric Waveform Ion Mobility Spectrometry—Mass Spectrometry;" Analytical Chemistry; (Jul. 1, 1999), vol. 71; pp. 2346-2357.

Purves et al.; "Mass Spectrometric Characterization of a High-Field Asymmetric Waveform Ion Mobility Spectrometer;" Review of Scientific Instruments; (Dec. 1998), vol. 69, No. 12; pp. 4094-4105.

Santee et al.; "Effects of Meteorological Parameters on Adequate Evaluation of the Thermal Environment;" J. Therm. Biol.; (1994), vol. 19, No. 3; pp. 187-198.

Stauffer et al.; "A Field-Coherence Technique for Meteorological Field-Program Design for Air Quality Studies. Part I: Description and Interpretation;" Journal of Applied Meteorology, (Mar. 2000), vol. 39; pp. 297-316.

Stauffer et al.; "Multiscale Four-Dimensional Data Assimilation;" Journal of Applied Meteorology; (Mar. 1994), vol. 33, pp. 416-434.

Tanrikulu et al.; "A Field-Coherence Technique for Meteorological Field-Program Design for Air Quality Studies. Part II: Evaluation in the San Joaquin Valley;" Journal of Applied Meteorology, (Mar. 2000), vol. 39, pp. 317-334.

Award/Contract No. DAMD17-00-C-0010; Issued by U.S. Army Medical Research Acquisition Activity, Director, 820 Chandler Street, Fort Detrick, MD 21702-5014; Contractor: Martin J. Mastroianni, VP, Technology Programs, ADA Technologies, Inc., 304 Inverness Way South, Suite 365, Englewood, CO 80112, Dec. 17, 1999; 36 pp.

Technical Abstract—SBIR Phase II Project; 2000; 1 p.

Weather Station Phase I Published Abstract; 2000; 1 p.

Omegg Engineering Sales Literature for Portable dataloggers, pp. F-83 to F-90 & F-97, 1991.

Sales literature, Rustrak Ranger II Data Logger, Jul. 1990.

Sales literature, Philip Harris, 1992.

DOE Abstract for DOE Grant No. DE-FG02-93ER81585, Nov. 1992.

Sales literature, Texas Instruments, Jan. 1994.

Sales literature, Micro Data Logger, 1993.

ADA Technologies, Inc., "Abstracts," vol. XIII, No. 1 (Spring 2003), pp. 1-6.

"Meteorological Instrumentation," Environmental Protection (printed Apr. 20, 2004), available at http://www.eponline.com/Stevens/EPPub.nsf/ProductView2?OpenForm&category=-Meteo..., pp. 1-3.

Climatronics Corporation Sales Literature, "TAMCET II Weather Sensor (EMI), 102304," (Mar. 18, 2003), 2 pp.

Declaration of Patrick French.

Carnahan et al.; "Development and Applications of Transverse Field Compensation Ion Mobility Spectrometer" Mines Safety Appliances Company, (date unknown), 20 pp.

Dust Networks, "Technical Overview of Time Synchronized Mesh Protocol (TSMP)," Document No. 025-0003-01, Last Revised Jun. 20, 2006, 18 pp.

| Software Layer | Hardware Layer | Handles |
|---|---|---|
| Sensor Node Layer | Sensor Controller Board | Sensor Operation<br>Top_Level Scheduling |
| Mesh Layer | Mesh Interface Card | Network Routing<br>Message Guarantee |
| Radio Layer | Radio Module | Collision Avoidance<br>Radio Connection |

LONG RANGE, LOW POWER, MESH NETWORKING WITHOUT CONCURRENT TIMING

CROSS REFERENCE TO RELATED APPLICATION

The present application claims the benefits of U.S. Provisional Application Ser. No. 60/884,966, filed Jan. 15, 2007, of the same title, which is incorporated herein by this reference in its entirety.

STATEMENT REGARDING FEDERALLY SPONSORED RESEARCH OR DEVELOPMENT

The U.S. Government has a paid-up license in this invention and the right in limited circumstances to require the patent owner to license others on reasonable terms as provided for by the terms of Contract No. W9132V-06-C-0006 awarded by the United States Army.

FIELD OF THE INVENTION

The invention relates generally to distributed networks and particularly to distributed data collection networks.

BACKGROUND OF THE INVENTION

Distributed networked sensor systems are used in scientific, military, and law enforcement applications. By way of example, Unattended Ground Sensors (UGSs) have been considered as a low cost means to detect illegal border crossings along remote stretches of the border of the United States and other countries. Such illegal border crossings are associated not only with illegal immigration but also with drug trafficking and terrorist organizations. The basic requirements for UGS networks include long term unattended operation (multi-year), covert deployment, wide area of coverage, long (e.g., up to 50) mile communications range, low false alarm rate, and cost effectiveness.

State-of-the-art UGS systems currently have limited applications for border monitoring as these existing systems do not offer wide area coverage. Existing UGS systems generally have a few sensor modules that are placed in an area of interest (such as trail). The sensor modules are often plugged into a data processing unit which has radio capability. A few of these data processing units are deployed in a relatively small area and report either to a satellite relay module or to a radio relay station. The radios of relay-stations are active at all times and require a significant battery capacity for relatively short duration deployments (2-3 months). The sensor modules and their data processing units use less power as they can wake-up, take a reading, and transmit the collected data to an always active relay station or satellite communications module. For border monitoring applications, it is desirable to place a much larger number of sensor modules (hundreds instead of 10-15) over wide areas of land to detect people and vehicles. Many of these areas of deployment are quite remote and therefore require relay stations to communicate with the command and control center.

The time for an UGS system to report a target to the command and control center is short. An average person moves at 5 mph. At this speed, border patrol authorities have about 12 minutes to apprehend the person to restrain his or her movement to within one mile of the border. This requires the person to be identified and classified and the collected information reviewed by a border patrol agent in minutes. It is thus important for the UGS system to be capable of reporting alarms and making the sensed data quickly.

In fighting drug trafficking activities, sensor deployment and redeployments need to be covert, as do the sensors themselves. As UGS are frequently deployed using intelligence gathered by field agents (suspected areas of operation), it is likely that the deployment area may be under surveillance by the adversary. Several examples can be cited where the adversary either removed the sensors shortly after deployment or, in one case, moved the sensors downstream so as not to tip off the law enforcement officers by deactivating the system. Based on these experiences, it is desirable to make the UGS easy to deploy covertly, difficult to tamper with after deployment, and difficult to see once deployed. Other desirable objectives for a UGS include: network scalability to accommodate a large number of sensors; low power operation for all field modules (including the current high power consuming relay stations); long range communication ability (e.g., anywhere from 1 to 50 miles); rapid alarming; covert deployment; and rapid and automated provision of the data to a decision maker.

The largest single missing element in current UGS systems is the lack of a commercially available low-power mesh networking solution for radios with multi-mile communications range. This missing element creates a network scalability issue and requires a mixture of high power consuming relay stations with low power sensor modules. As background, mesh networking allows sensor modules to act as data relays for other sensor modules, thereby eliminating the constraint that all the sensors must have line-of-sight communications to a base (gateway) node. Mesh networking can greatly simplify installation as the installer need only confirm that the sensor he or she is currently deploying has line of sight to at least one other sensor or a base node. Mesh networking also can increase reliability. If one link in the network drops out, the network can reform to get data back to the base. While a great deal of research has been done for mesh networking for battery-powered radios with short range communications (10 m to 200 m) such as "smart dust" and Zigbee, very little has been done for radios with multi-mile communications range as required by applications such as border monitoring. The little work that has been done in this area assumes unlimited power at many of the "routing" nodes, which, again, does not match well with many UGS applications.

SUMMARY OF THE INVENTION

These and other needs are addressed by the various embodiments and configurations of the present invention. The present invention is directed generally to wireless networks having spatially dislocated nodes and specifically to a network of radio-equipped sensor nodes.

In a first embodiment, a method is provided that includes the steps:

(a) providing a listen time for each sensor node, such that, during the listen time, the radio of the corresponding sensor node is activated and able to receive wireless signals and, during times other than the listen time, the radio is commonly deactivated and unable to receive wireless signals;

(b) transmitting, by a first sensor node, to a second sensor node a first message, the first message including a time offset from a transmission time of the message, the time offset indicating a timing of a first listen time for the first sensor node; and (c) in response, scheduling, by the second sensor node, a time to transmit a second message to the first sensor node, the transmit time being based on the time offset.

In a second embodiment, a method is provided that includes the steps:

(a) selecting, by a first node, a number of nodes as a possible parent;

(b) assigning, by the first node, a value to each of the selected nodes, the value being a function of a plurality of a number of hops from a respective selected node to a common destination, a received signal strength measured at the first node for signals from the respective selected node, a number of child nodes associated with the respective selected node, and a remaining battery power of the respective selected node; and (c) requesting, by the first node, the member of the plurality of nodes having the best (e.g., highest or lowest) value to be the parent node of the first node.

Family relationships are used in this embodiment to effect routing. Generally, any messages to be directed to the base node are forwarded by a child node to its parent node. This routing mechanism requires only that a child node know its parent node and does not require the parent node to know its child nodes or the base node to know the message routing.

The present invention can provide a number of advantages depending on the particular configuration. By way of example, the wireless network can, through the use of mesh networking techniques, be self-forming and self-healing, allowing sensor nodes to be deployed in any fashion provided that the sensor nodes have a line-of-sight to at least one other sensor node (even if the sensor node has no line-of-sight to a base node). This capability can lessen deployment constraints and address several anticipated deployment scenarios. Cycling of the radios of the sensor nodes can reduce significantly power consumption by the sensor nodes, thereby prolonging sensor node life. Using relative time offsets to schedule communications can obviate the need for precise time synchronization among the nodes, thereby reducing the need for thermal regulation of internal timers and sensor node power consumption. The wireless network can be configured to allow for unscheduled communications, such as alarms, in near real time. Message delivery can be guaranteed from node-to-node, so that acknowledge messages are shared at the node level and not from the final destination to the message's point of origin. This message guarantee protocol can provide more reliable radio communications, without unduly increasing power consumption. The network configuration can be readily scaled to large number of sensors, provide long range communications, and be deployed covertly.

These and other advantages will be apparent from the disclosure of the invention(s) contained herein.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The Network Architecture

Figure 1:
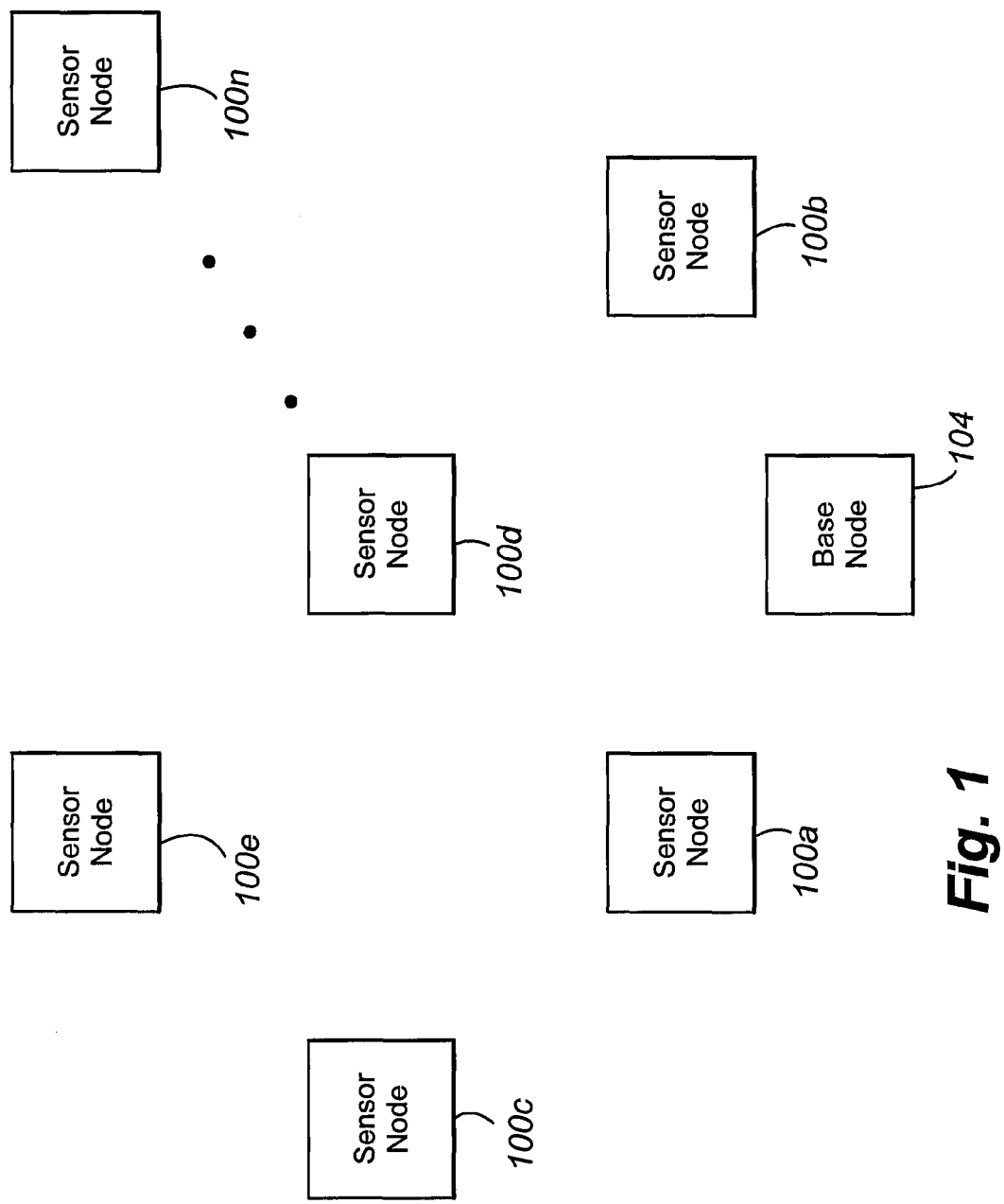
FIG. 1 is a distributed wireless network architecture according to an embodiment of the present invention.

An embodiment of a network architecture according to a first embodiment will be discussed with reference to FIGS. 1-4. The network includes a number of spatially dislocated sensor nodes 100a-n in wireless communication with one another and with a base (gateway-equipped) node 104. The various sensor nodes 100a-n are grouped into families, each family including spatially proximal sets of nodes. For example, sensor node 100a is a parent to nodes 100c and 100d and a grandparent to node 100e. Node 100e is a child of node 100d, or, stated another way, node 100d is a parent of node 100e. As discussed below, the family groupings are used in routing messages through the network.

In one configuration, each node 100a-n includes a radio 200, a sensor module 204, a database 208, a mesh interface card 212, an internal power source 216, and a sensor node controller 220. The nodes can, of course, include more or fewer or different components depending on the application.

The radio 200 can be any suitable radio for effecting short (e.g., 10 m to 200 m) or long (e.g., one or more miles) range wireless communications. The communications can be conducted at radio frequency or some other suitable frequency range or combination of frequency ranges.

The sensor module 204 can be a suite of sensors for collecting differing types of external data. Examples of data to be collected include the presence or concentration of target substances or microbes, meteorological parameters, radiation levels, horizontal visibility, cloud ceiling, physical location (e.g., satellite-based location coordinates), ground vibrations, noise levels, video images, physical motion, and sensor module orientation (e.g., pitch, roll, yaw, and tilt).

Figures 5, 6:
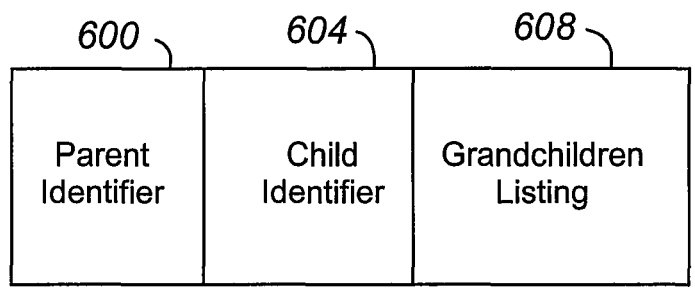
FIG. 5 depicts data structures according to an embodiment.
FIG. 6 depicts data structures according to an embodiment.

The database 208 includes data structures regarding not only collected data but also operating parameters associated with the subject node and its neighbors. FIGS. 5-6 depict typical data structures. With reference to FIG. 5, a first set of data structures includes a node identifier 500 (which is unique among all network node identifiers in the network) and, for each node identifier, a standard listen time 504, an indicator 508 (yes or no) whether or not the identified node is a parent, an indicator 512 (yes or no) whether or not the identified node is a child, a number of hops 516 to the base node 104, a battery status 520, a number 524 of the children of the identified node, and a received signal strength indicator (RSSI) 528 for the identified node. Referring to FIG. 6, a second set of data structures includes a parent identifier 600 of the subject node, the node identifiers 604 of each child of the subject node, and grandchildren node identifiers 608 of the subject node. The grandchildren node identifiers 608 are indexed by each listed child node 604 acting as a parent node to the grandchildren nodes.

Figures 3, 4:
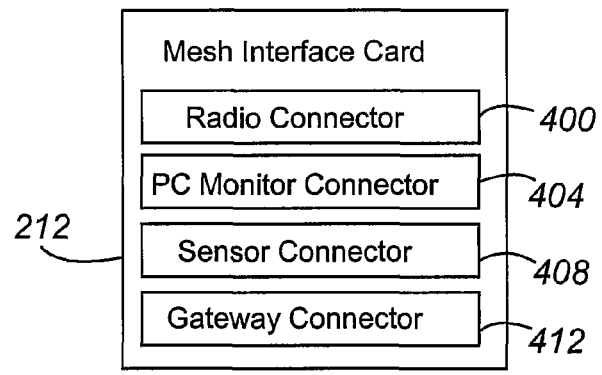
FIG. 3 depicts the firmware layers according to an embodiment.
FIG. 4 is a block diagram depicting connectors on a mesh interface card according to an embodiment.

The mesh interface card 212, with reference to FIG. 4, includes radio connector 400, PC monitor connector 404, sensor connector 408, and gateway connector 412. The radio connector 400 connects to the radio 200, the PC monitor connector 404 to an optional personal computer (not shown) for configuration, debugging or monitoring, the sensor connector 408 to the sensor module 204, and the gateway connector 412 to a gateway (not shown) (such as a satellite modem, cellular modem, PC, or another Mesh Interface Card (MIC)). The gateway connector is normally attached to a gateway unit when the node is configured as a base node 104. Commonly, the MIC 212 is logically positioned between the sensor node controller 220 and the radio 200. Stated another way, the MIC 212 is connected to a socket for the radio 200 on a sensor node controller 220 board. The radio 200 is then connected to the radio connector 400. The MIC 212 typically communicates via serial communications to the other hardware modules, namely the sensor 204, the radio 200, the optional PC (not shown), and the sensor node controller 220.

The internal power source 216 is generally a number of batteries and can include a renewable energy source, such as a solar cell array.

The sensor node controller 220 performs overall control of the operations and functions of the sensor node 100. The sensor node controller 220, for example, controls sensor module 204 operation and top-level scheduling. Top-level scheduling includes scheduling data collection by the sensor module 204, data reporting of the collected data to other sensor nodes 100, and power on and power off cycles for the radio 200. Examples of sensor node commands include data collection rate, communications interval time, sensor configuration such as parameters to report, and requests for logged data.

Figure 2:
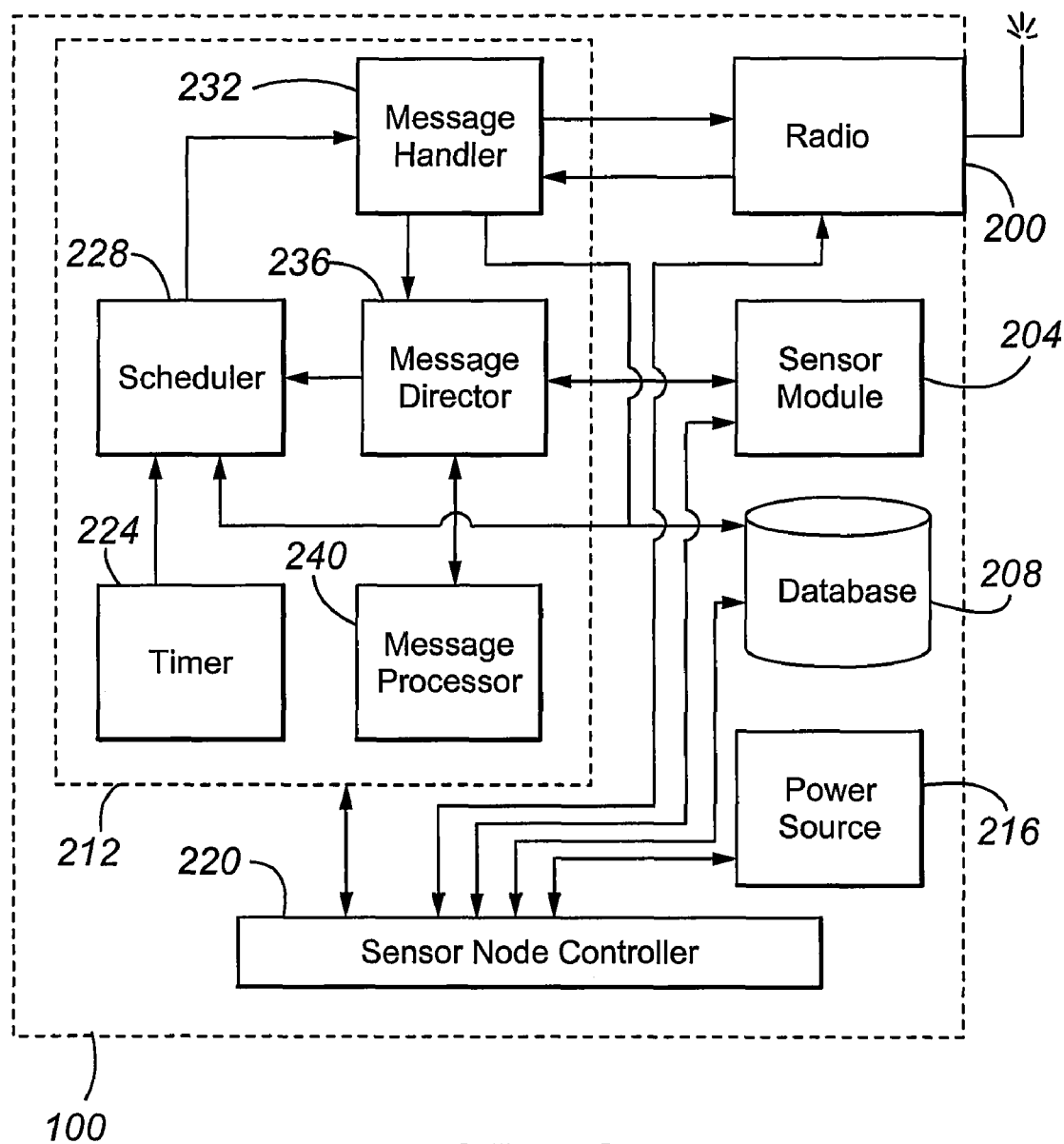
FIG. 2 is a block diagram depicting sensor node according to an embodiment.

The functional components of the MIC 212 will now be discussed with reference to FIG. 2. The MIC 212 includes a timer 224 to provide timing information, a scheduler 228 to schedule and request scheduling of inter-nodal message transmissions, a message handler 232 to handle failed messages, wrap and unwrap headers and trailers of message packets, and handle acknowledge and not acknowledge messages, a message director 236 to direct incoming and outgoing messages to an appropriate sensor node component, and a message processor 240 to respond to network queries and process query responses, perform database 208 updates and data entries, select parent node(s), select child node(s), handle configuration/initialization messages, handle network routing decisions and messages, handle testing messages, and handle changes in network routing.

FIG. 4 shows the firmware layers employed in network and sensor operations. The layers include a sensor node layer, a mesh layer, and a radio layer. Although three firmware layers are employed for communications, other network configurations may have fewer or more layers.

The highest layer of the three firmware layers is the sensor node layer. The sensor node layer corresponds to the sensor node controller 220 and performs sensor node operation and top-level scheduling. In the sensor node firmware layer, the basic operation of the sensor node is performed. This operation includes making measurements, logging data, determining alarm status, and reporting data and/or alarms back to a message director. Communications on this layer are divided into regularly scheduled communications and unscheduled alarms. Alarms are signals indicating the detection by the sensor module 204 of a predetermined parameter, suite of parameters, or level of sensed parameter. For regularly scheduled data reports, the message director provides the sensor node with a schedule for measurement and reporting. Typically, it is desirable to have all sensor modules 204 measure at the same time and to stagger the inter-node data reporting times to level out the overall network traffic. The addition of the mesh layer is seamless to this layer. Non-scheduled communications (such as rapid alarms) require the mesh networking components.

The next highest layer, the mesh layer, corresponds to a Mesh Interface Card (MIC) 212 and performs network routing and inter-node message guarantee. The mesh layer includes mesh networking firmware and hardware. The mesh layer handles all message routing and is unaware of any distinction between scheduled or unscheduled communications. The MIC 212 receives a message packet either from the sensor module 204 or through the radio 200 and sends the packet to its destination (whether to a next node via the radio or to the physically attached sensor module 204). The mesh layer finds neighbors, selects parents, relays data, and is responsible for message delivery guarantees. All aspects of network routing are maintained in the mesh layer so that the sensor module need not know whether it is in a mesh or star topology.

The radio layer corresponds to the radio 200 and performs collision avoidance and radio connection. The operation at this layer is determined by the particular communications protocol employed by the radio 200.

Constraints on mesh networking include the substantial minimization of power consumption and the avoidance of precise time synchronization. These constraints are addressed as provided below.

Figure 7:
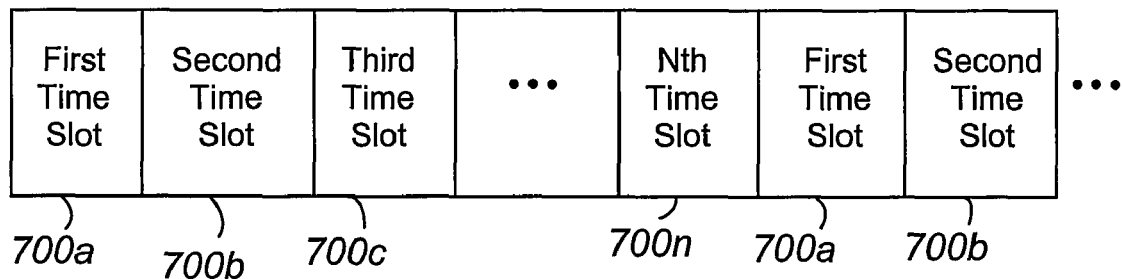
FIG. 7 depicts a time slot identification scheme according to an embodiment.

Power consumption is substantially minimized by turning the radio 200 off (in which mode the radio is unable to speak or listen) most of the time. This is realized by duty cycling the radio. Each node's radio is turned on in listen-only mode for a short period of time at a regular interval. Referring to FIG. 7, mesh networking communicates in time slots of substantially equal length. The network is set up with a fixed number of time slots. Time slots are identified by timing information, which is typically a time received from the timer 224 but could be by an interval identifier during a periodic time interval. As shown in FIG. 7, each sensor node recognizes first, second, third, . . . nth time slots 700a-n, which repeat after a selected time interval. By way of further illustration, each node's radio 200 can be put to listen-only mode for ½ second (the time slot duration) out of every 20 seconds (the time interval duration). Thus, there are 40 time slots, or listen-only periods, in each time interval. The time slot selected by a node for the listen-only mode is hereinafter referred to as the "standard listen time" of the node. When a node is powered on, it randomly or pseudo-randomly selects which time slot will be its standard listen time. It is unnecessary for each node to have a unique standard listen time.

Figure 8:
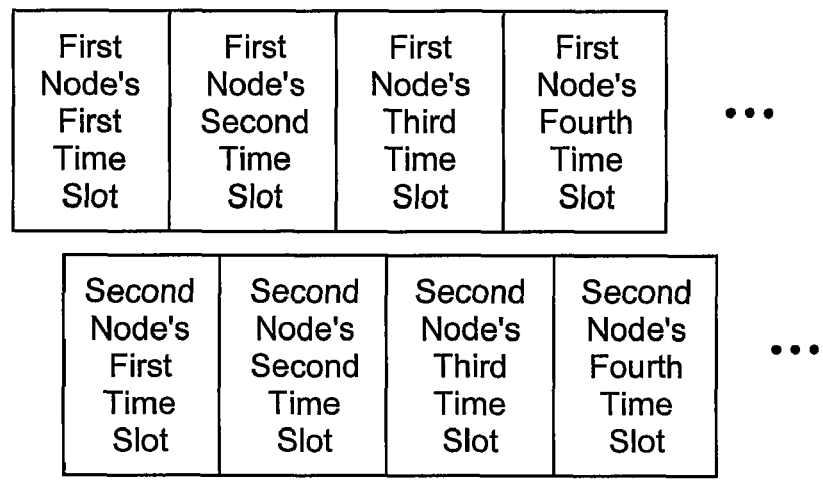
FIG. 8 depicts time slot identification schemes of differing nodes according to an embodiment.

Avoidance of precise time synchronization is realized by using a fixed duration of the standard listen times, but not requiring the starting point to be a fixed time. FIG. 8 shows that two nodes can have skewed time slots. In FIG. 8, a first node has first, second, third, fourth . . . time slots in a first time interval while a different second node has temporally offset first, second, third, fourth . . . time slots in the same time interval. The commonly identified time slots of the first and second nodes start at differing times. Time slots are learned through inter-nodal messages including the standard listening times of other nodes. In each message transmitted by a node, the node includes its standard listening time. The standard listening time is measured relative to the current communication transmission time of the message packet containing the standard listening time. When a message packet is sent by a node, one number in the packet provides the current number of time segments (e.g., seconds) until the transmitting node's next standard listen time.

A node initiates communications with a specific node when it knows that the other node will be listening. After a node decides its standard listen time, the node repeatedly transmits a "request to send" message to discover its neighboring nodes' standard listening times. The node re-transmits the same request twice in each time slot for a full time interval. Since the node transmits twice for each time slot for a full time interval, at least one request will have been sent during all the neighboring node's listen times.

In one configuration, each request to send message is nominally 20 bytes at 9600 baud, which takes about 20 milliseconds to transmit. This is a short time compared to a 500 ms time slot; however, it is still possible to have collisions. These are substantially reduced by the radio modem's feature to wait for a clear channel before message transmission. This means that, if one radio 200 is asked by the scheduler 228 to transmit, the radio 200 will listen first and only transmit after the radio does not hear any other node's transmissions.

Using relative as opposed to absolute timing information can maintain acceptable levels of time keeping accuracy over the full temperature extreme. With a relatively wide listen time (e.g., 0.5 seconds) and a reporting interval nominally of every 15 minutes, time keeping accuracy could be as poor as 0.25 seconds out of 15 minutes without losing the connection (or the ability to time a transmission during the other node's standard listen time). For nodes that communicate frequently, such as a parent and child, time synchronization is updated continuously as part of the standard exchange.

The MIC 212 will re-transmit messages typically using a random back-off scheme. Most communications are nominally 20 bytes (20.8 ms) except for data, which can be up to 88 bytes (91.67 ms). So, nominally 20 ms later or, for data messages, 91.67 ms later, the node could communicate successfully. Multiple data transmissions fit into one time slot because a data transmission entails a clear to send (CTS) message, a data message, and an acknowledge (roughly 132 ms).

Data communications are generally performed outside of the standard listen time. The listen time is used to schedule a time for the full data packet. The data transmission is scheduled to occur in an open timeslot (using the first set of data structures of FIG. 5). Assuming forty time slots in a time interval, a worst case scenario is a star topology in which all nodes are seen by a single node. With forty time slots, up to 32 nodes could have a unique time slot (though statistically several nodes would be in a common time slot). Thus, there would be at least eight time slots left for data communications. Generally, each node would see ten or fewer other nodes, thereby leaving thirty or more open time slots for data transmission.

Message packets generally follow a common message format. Each message includes a message start delimiter, a source identifier for this hop (the message sender for this hop) (with two bytes representing the source identifier), a target identifier for this hop (the message target for this hop) (with two bytes representing the target identifier), a hop message identifier (two bytes), a source identifier (the message originator) (two bytes), a target identifier (the ultimate message destination) (two bytes), a message identifier (e.g., identifier of message being responded to or acknowledged or the current message's unique identifier) (two bytes), a message type (one byte), listen time (time the sender will be listening measured from the transmission time (in timer ticks) (two bytes), standard listen time (time until the sender's next standard listening time measured from the transmission time (in timer ticks) (two bytes), body of the message (either a command or response), Cyclic Redundancy Checker (CRC) (checksum for the message), and message end delimiter. Possible message types include acknowledge, not acknowledge, response, request to send (RTS), clear to send (CTS), alert, need parent, have parent, be parent, parent/child, data, set terminal mode, reset terminal mode, get routing lists, get neighbor list, get visibility list, set visibility list, add node to visibility list, and remove node from visibility list.

Message Guarantee Protocol

Figure 16:
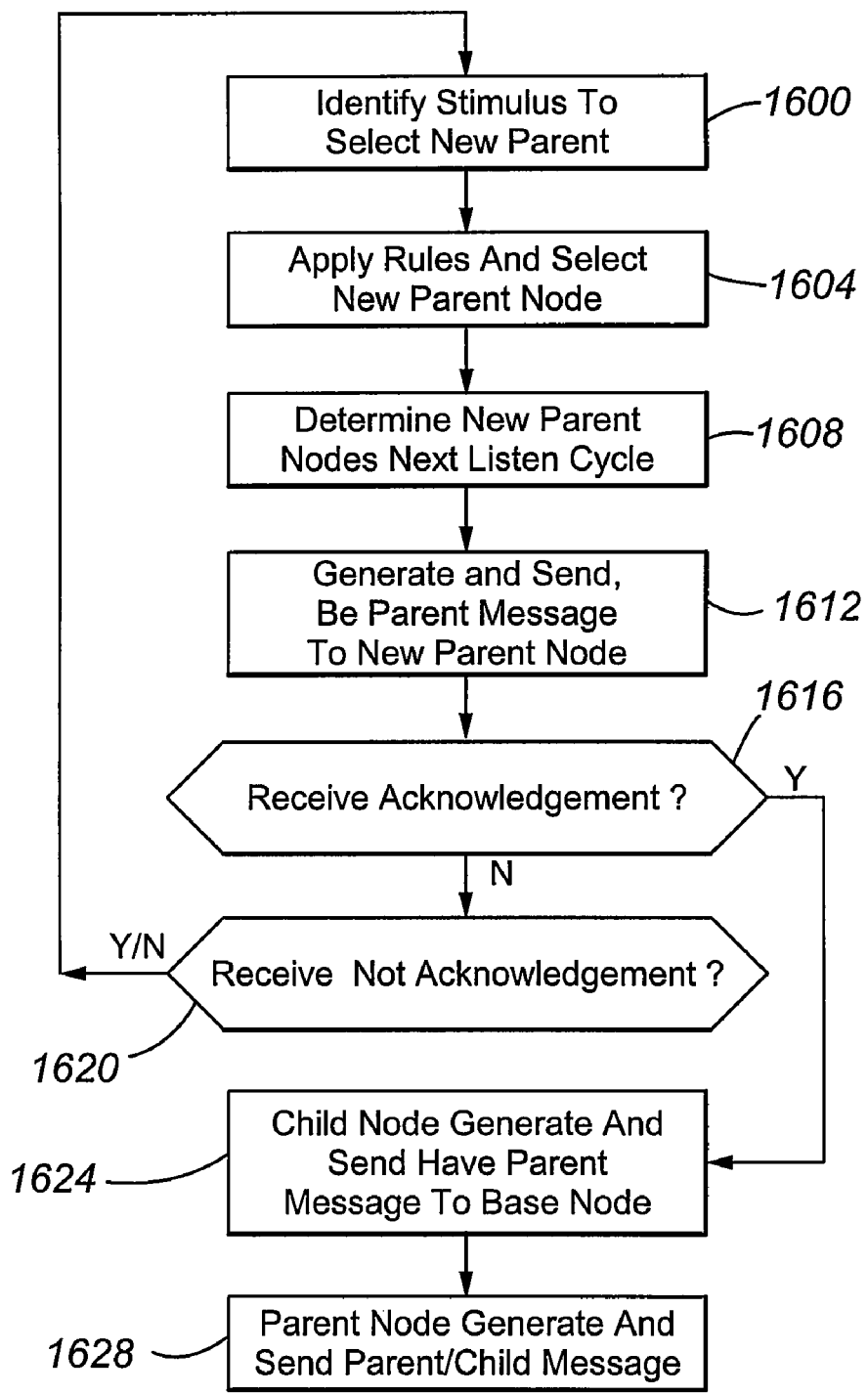
FIG. 16 is a flow chart according to an embodiment.

All messages require an acknowledge to the sender, thereby providing guaranteed message delivery between nodes. Each node of the mesh network assumes ownership of a message it receives as soon as it acknowledges the message receipt to the sender. A message is rejected by a receiving node with a "not acknowledge" message. This will happen when the rejecting node has lost its parent node. The only exception is the acknowledge message itself. In the mesh network, it is possible that no response will be received due to a collision, and, in this case, the message is resent. When the number of resends exceeds a pre-defined threshold, the sending node will enter the initialization mode searching for a parent (FIG. 16).

Message delivery end-to-end is not acknowledged. For example, when a message is sent from a node 100 to the base node 104, which is five hops away, there will be an acknowledge between each set of nodes at each layer of the network that have successfully passed the message to the next level or at inter-nodal hops in a common level. A "level" refers to a vertical tier in a family relationship (e.g., parents are at one level, children a second level, grandchildren a third level, and so on). When the message arrives at the base node 104, the base node 104 acknowledges to the last node 100 in the relay chain that the base node 104 has received the message. The base node does not send an acknowledge to the message originating node. This hop-by-hop acknowledge can minimize communications and lower power consumption. This technique can, however, cause a message to be lost irretrievably when a node loses the network indefinitely when attempting to relay a message. When a disconnected node later finds the network, it will pass along the message it was relaying.

There are two situations to account for in a message guarantee protocol, namely failure from above and failure from below. Failure from above means that a message originating at the base node 104 and targeted to a node 100 several hops away, or several layers deep, is blocked by a reconfiguring network segment. Failure from below indicates that a message being sent by a node 100 to the base node 104 is blocked by a reconfiguring network segment.

With the above in mind, the message guarantee protocol is discussed below with reference to FIGS. 13-14.

Figure 13:
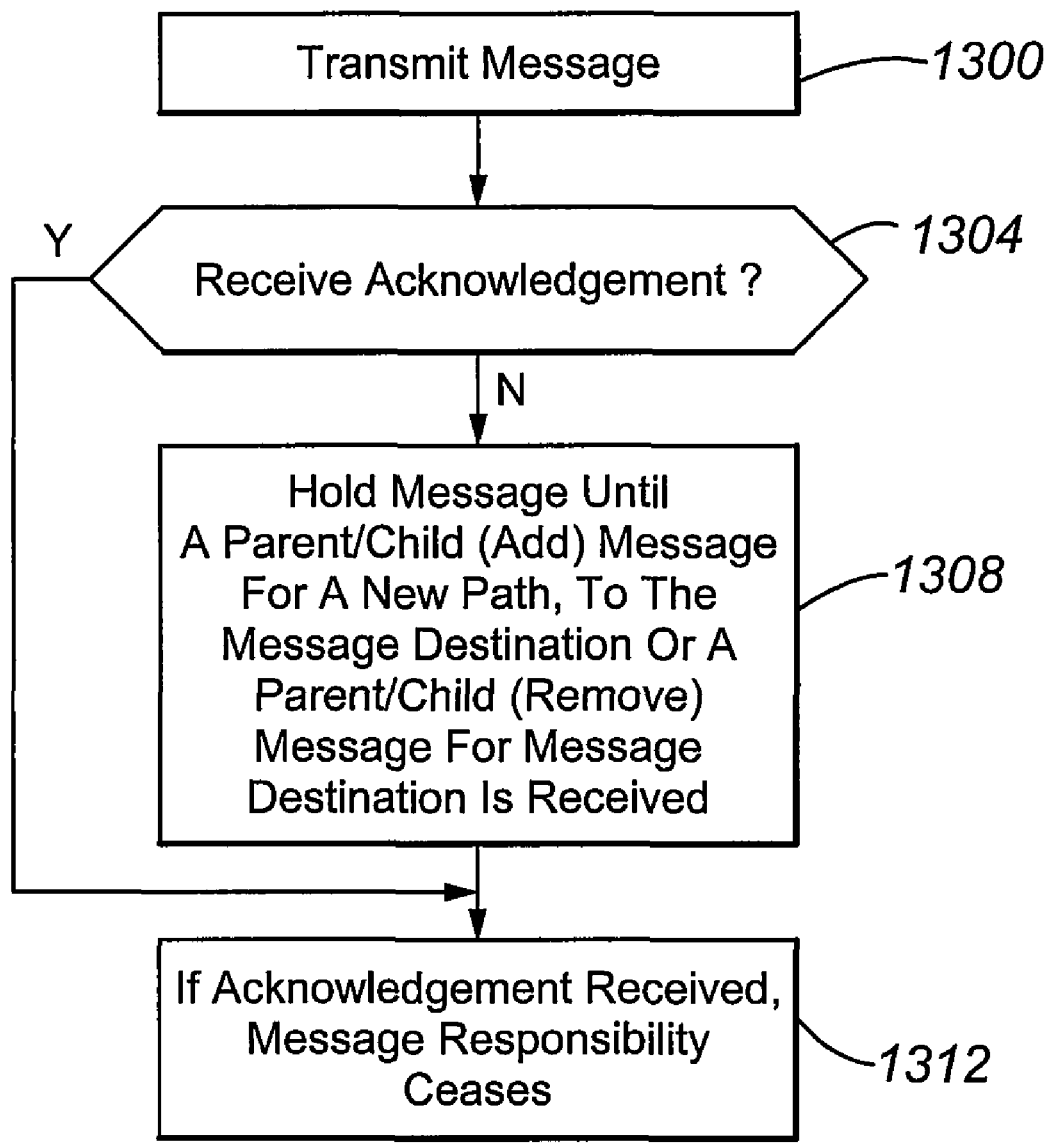
FIG. 13 is a flow chart according to an embodiment.

With reference to FIG. 13, a node, in step 1300, transmits a message to a target destination. The message includes a network wrapper including the message originating address, the message destination address, and the next hop address.

In decision diamond 1304, the message handler 232 of the sending node determines whether an acknowledge message referencing the message has been received.

When an acknowledge message has been received, the message handler 232 in step 1312, terminates responsibility for message.

When a not acknowledge message has been received or when no acknowledge message has been received, the message handler 232, in step 1308, holds the message until receipt of a parent/child (add) message for a new path to the message destination or a parent/child (remove) message removing the message destination. A parent/child message is forwarded to a parent node when a new child has been added or an existing child removed. The body of the parent/child message includes an "A" to add a child or "R" to remove a child, the base node identifier, the parent node identifier, and the child node identifier.

The parent/child (add) message is forwarded from parent node-to-parent node until it eventually reaches the base node 104. If at any node in the message forwarding process, the new child is listed under another parent node, the forwarding node sends a new parent/child message to the former (old) parent node to update the second set of data structures. A parent node will see the parent/child add message as it relays the message in the relay chain to the base node 104.

When the parent/child (remove) message removes a child and, as a result, the new network path to the final message destination is no longer through the node possessing the message, the node will not know about the routing structure change until it receives an update message from the base node 104.

When the message possessing node receives a parent/child (add) message from one of its child nodes, the message possessing node will route the message to its destination via the new child path. When the message possessing node receives a parent/child (remove) message for the destination from its parent node (issued by the base node 104), the possessing node will route the message back to its parent node. The message will be routed upwards towards the base node 104 until it reaches a node with a path to the destination (potentially all the way to the base node 104). At that node, the message will be routed along the new path to the destination.

The foregoing examples pertain to a failure from above. In a failure from below, the message possessing node recognizes that it has lost its parent. Since the sending node has already acknowledged the message receipt from a previous sender, the sending node now is responsible for the message.

The sending node must send out a need parent message, which is broadcast to its neighbor nodes. If the message body has a value of zero for the base node identifier, the sending node is seeking a primary path to the base node 104. If the message body has a non-zero value for the base node identifier, the sending node is seeking a secondary path to the base node 104. All nodes receiving the need parent message will respond either with an acknowledge or not acknowledge message. If the response is an acknowledge, the responding node has a parent.

Any child nodes of the sending node will receive the need parent message and recognize that they are also parentless and will themselves send out a need parent message. The process for establishing a path to the base node is the same as during initialization. Provided a new path to the base node is found, the message being relayed may be delayed while the network reconfigures but will ultimately be delivered.

Figure 14:
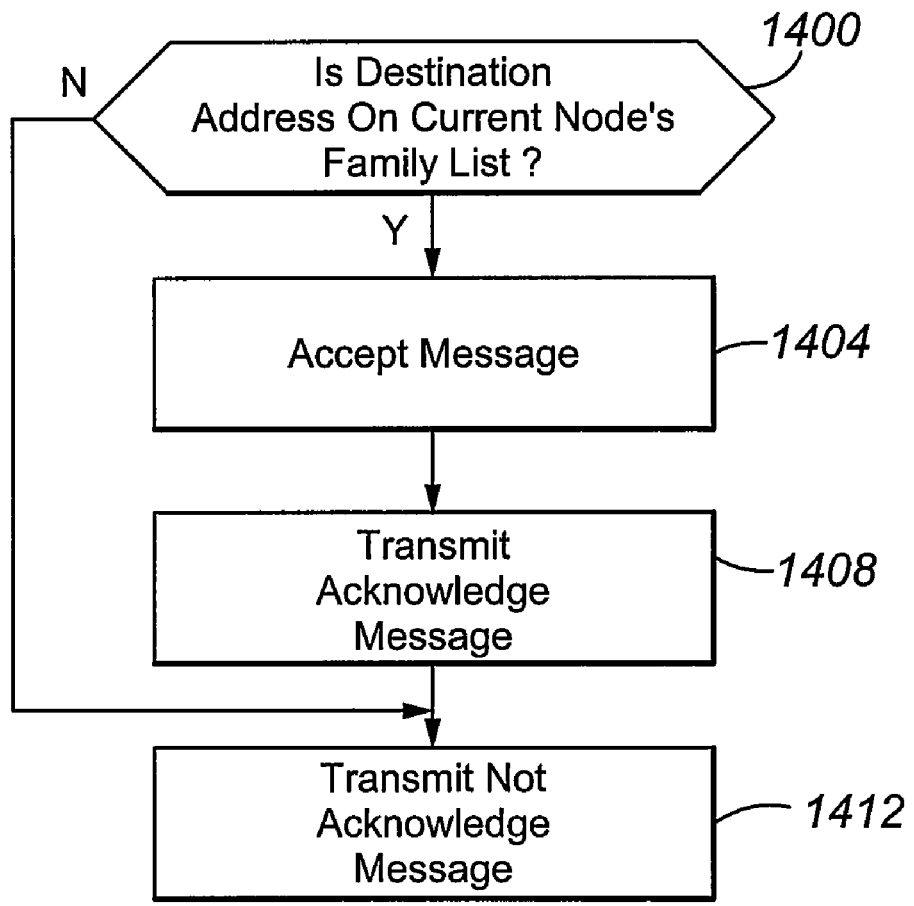
FIG. 14 is a flow chart according to an embodiment.

Turning now to FIG. 14, the message acknowledge protocol will be discussed.

In step 1400, a node, after receiving a message from a sending node determines whether or not the message's destination address is on the current node's family list (e.g., on the node's child or grandchild list).

In step 1404, when the destination is on the node's family list, the message handler 232 will accept the message; otherwise the message handler 232 will not accept responsibility for the message.

In step 1408, the message handler transmits an acknowledge message.

If the destination address is not on the current node's family list, the message handler 232 transmits a not acknowledge message in step 1412.

Request to Send Protocol

The request to send (RTS) protocol will now be discussed with reference to FIG. 15. The RTS message is used to initiate communication with another node. A clear to send (CTS) message is the response to an RTS message.

In optional step 1500, the scheduler 228 randomly or pseudo-randomly selects a standard listening time slot. This step is part of a node's initialization procedure.

In step 1504, the scheduler 228 transmits an RTS message to discover the neighbor node's selected standard listen times.

In step 1508, the scheduler 228 receives a clear to send (CTS) message from a neighbor node.

In step 1512, the message processor 240 updates the first set of data structures.

Figure 17:
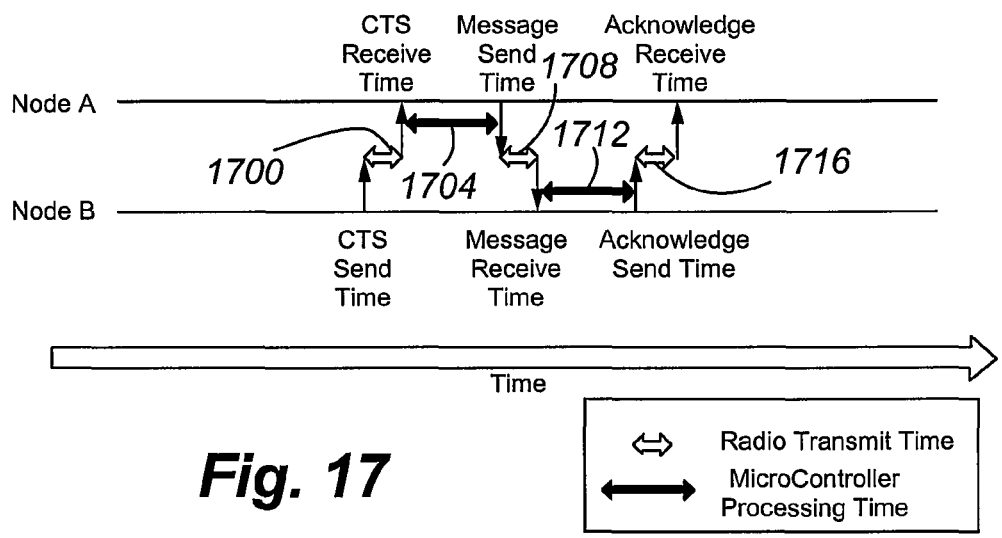
FIG. 17 depicts scheduled inter-nodal communication according to an embodiment.

FIG. 17 is an example of a scheduled communication diagram. Two nodes, namely nodes A and B, communicate with one another regarding scheduling a communication. Node B sends to node A a CTS message having a CTS send time. A short time later denoted by double arrow 1700 (which represents radio transit time), node A receives the CTS message. Node A waits a time period denoted by double arrow 1704 and sends the message at the standard listen time of node B. Node A's standard listen time for node B is offset from the actual (absolute) time by the duration of the double arrow 1700. A short time thereafter denoted by double arrow 1708 (the radio transit time), node B receives the message. After determining that the message is to be acknowledged, node B, after time 1712 (the microcontroller processing time), sends an acknowledge, which is received by node A after time period 1716 (the radio transit time).

Figure 18:
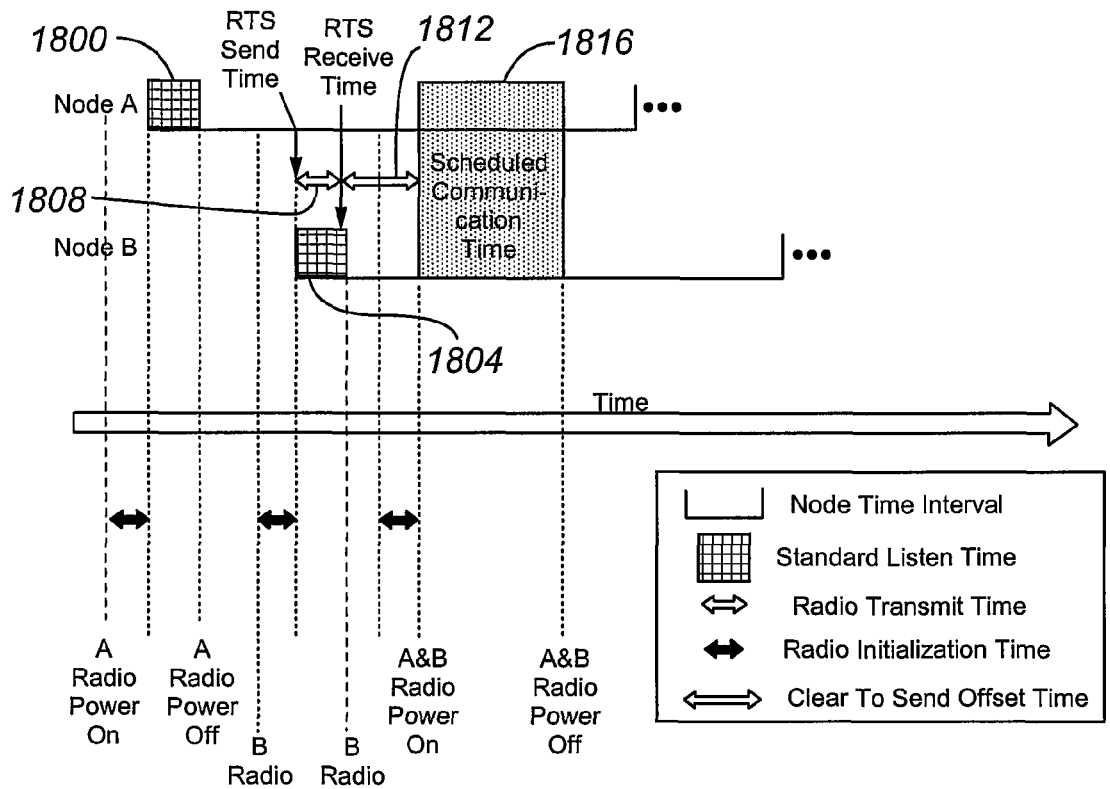
FIG. 18 depicts inter-nodal communication according to an embodiment.

FIG. 18 is another example of a communication timing diagram. Two nodes, namely nodes A and B, communicate with one another. Node A powers its radio during standard listen time 1800, and node B during standard listen time 1804. Node A, based on its estimate of node B's standard listen time, sends during node B's standard listen time an RTS message. After radio transit time 1808, node B receives the message during its standard listen time 1804. Node B responds with a CTS message (not shown) setting forth an offset time 1812. The nodes thereafter communicate with one another during the scheduled communication time 1816.

Initial Connection of a Node to the Network

Figure 9:
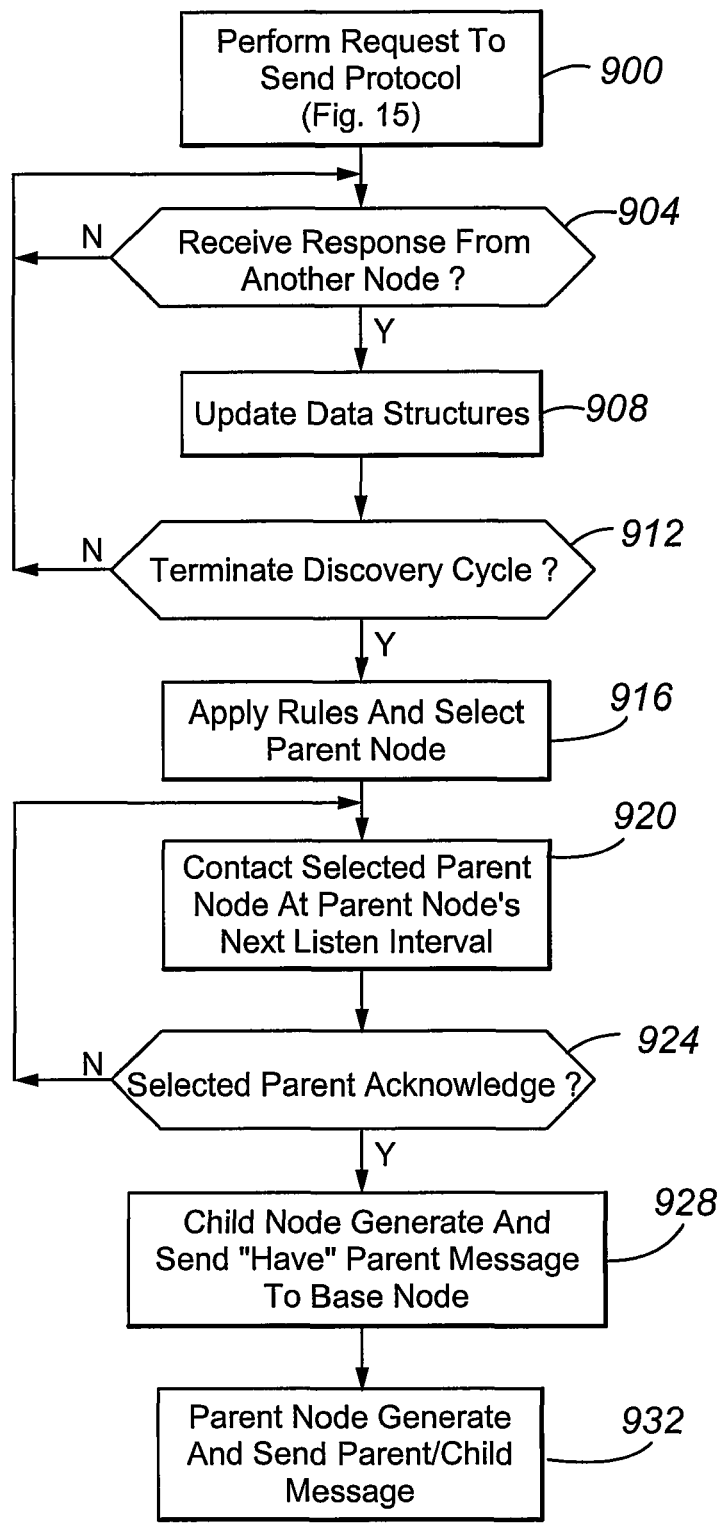
FIG. 9 is a flow chart according to an embodiment.

FIG. 9 depicts the steps performed by a selected node when it initially connects to the network (the node initialization procedure).

Figure 15:
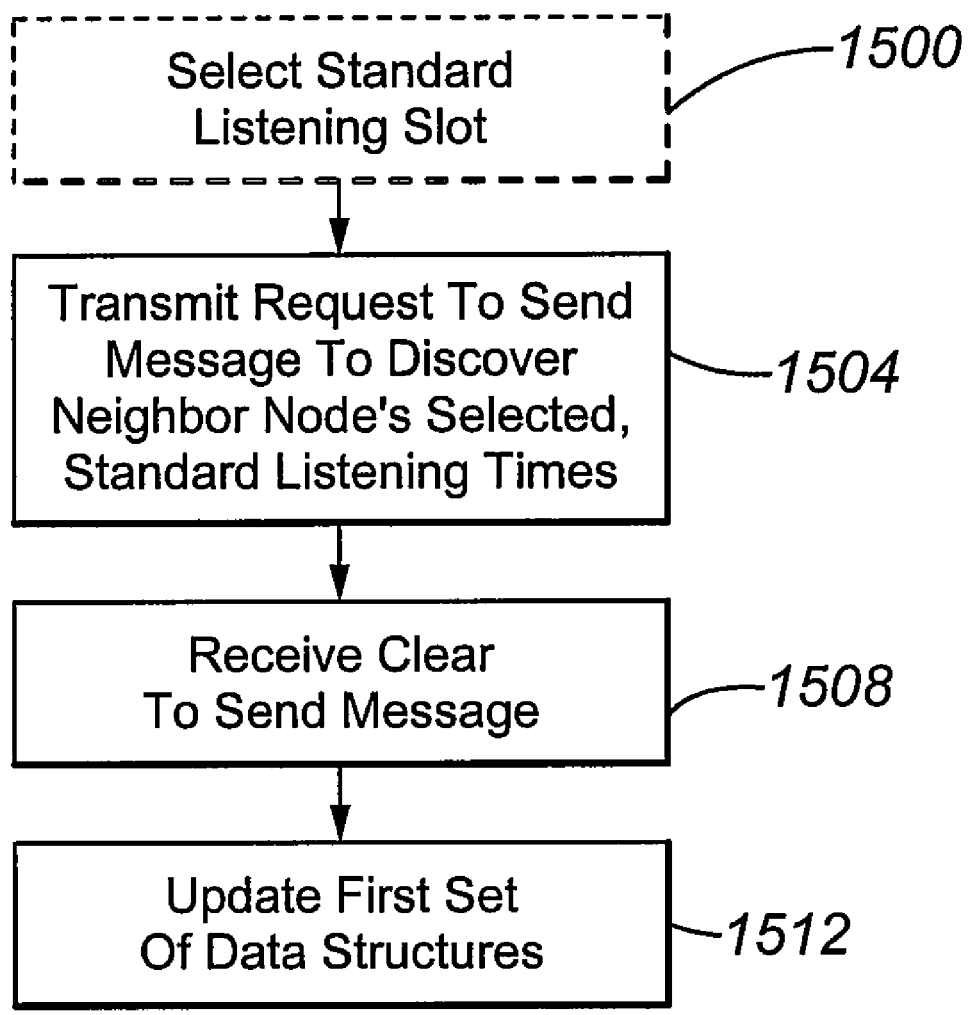
FIG. 15 is a flow chart according to an embodiment.

In step 900, the scheduler 228 performs the request to send or RTS protocol (FIG. 15). During auto discovery, the target identifier for this hope is set to zero to indicate that the node is looking for its neighbors. Once a node receives a CTS message from its neighbors, it will know the neighbor's next listen time and be able to "synchronize" its attempts to communicate, thereby saving power. The CTS message includes the node identifier of the responding node, the number of hops from the responding node to the base node, the battery status of the responding node, the number of child nodes for which the responding node is the parent, the RSSI of the responding node, and the number of ticks until the responding node's next listen-only period.

In decision diamond 904, the message processor 240 determines whether or not a response has been received from another node. If not, the processor 240 repeats decision diamond 904 until it times out. If so, the processor 240 updates the data structures and, in decision diamond 912, determines whether or not to terminate the discovery cycle. When the discovery cycle is to continue, the processor 240 returns to decision diamond 904. When the discovery cycle terminates, the processor 240 proceeds to step 916.

In step 916, the message processor 240 selects a parent from the discovered first and second set of data structures. The most heavily weighted selection criterion is the number of hops from the would-be parent to the base node. The next most heavily weighted selection criterion is the RSSI. The next weighted selection criterion is the total number of children the would-be parent currently possesses. Finally, the battery power of the would-be parent is considered. The various factors are weighted and a cumulative score is assigned to each would-be parent. The would-be parent having the best score is selected as the first choice, having the next best score as the second choice, and so on.

In step 920, the message processor 240 sends a need parent message to the first choice would-be parent node at that node's next standard listen time.

In decision diamond 924, the message processor 240 determines whether the contacted node has returned an acknowledge message, which would indicate that it has accepted the request to act as the parent.

If no acknowledge message is received or a not acknowledge message is received, the message processor 240 returns to and repeats step 920 using the next choice node.

If an acknowledge message is received, the message processor, in step 928, generates and sends a have parent message to the base node 104. The have parent message is broadcast to all neighbors of the originating node. The proper response to the message is an acknowledge message.

Message Routing Protocol

Each node 100 generally has incomplete first and second data structures while the base node 104 maintains a complete first and second data structures describing the network topology and configuration of the entire network. Each node generally knows its parent, children, and the children's offspring (e.g., children, grandchildren, great grandchildren, etc.). The nodes 100 thus generally know only the next hop and do not know the entire path the message will take to its ultimate destination.

Hops are commonly selected based on family relationships. For example, if a grandchild node is the originator of a message and the base node the ultimate destination, it selects as a first hop its parent node. The message thus is addressed to its parent node for this hop. When the grandchild's parent node (or the child node) receives the message, it selects as the next or second hop its parent node. The message is thus addressed to the child's parent node for the next hop. This process is repeated until the message is received ultimately at the base node. Generally, a parent node 100 is fewer hops from the base node 104 than its child nodes 100.

Routing information is generally transmitted separately from data messages. Each message sent through the network has a network wrapper including the ultimate destination address, the originating address, the current hop sending address, and the current hop target address. As the messages pass through each node, each node determines whether it is a message that the node is supposed to relay or whether the node is the final destination. When the node is supposed to relay the message, the node will change the next hop address and forward the message accordingly. Each node further updates its data structures by reviewing the originating node's identifier. Routing information is only transmitted back to the base node 104 when there has been a change in network configuration. When a parent/child relationship is changed, a parent/child message is sent to the base node. Nodes that relay such messages use it to update their (local) first and second data structures. The base node will use the message to update its first and second data structures to maintain a complete and comprehensive network topology and configuration.

Figure 10:
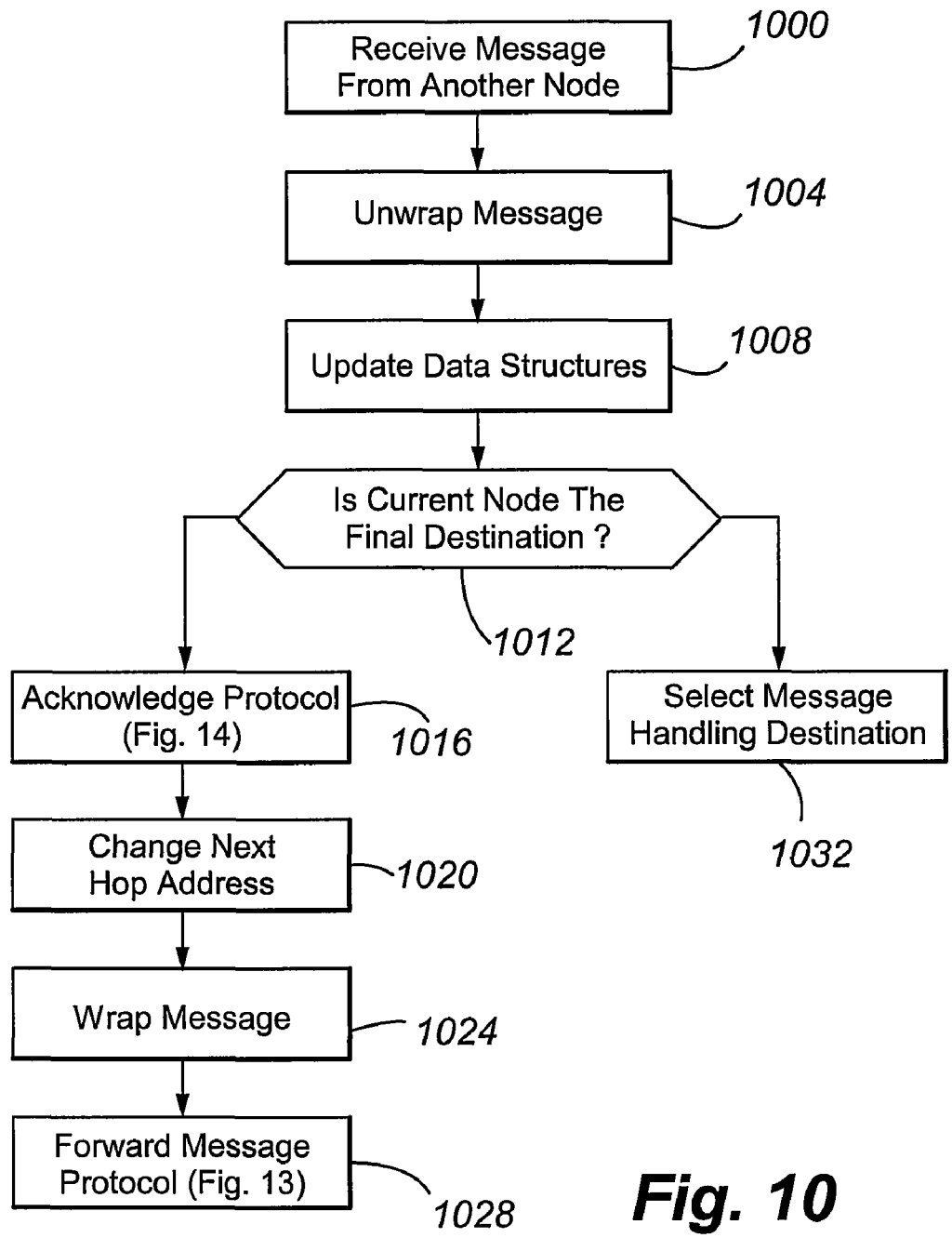
FIG. 10 is a flow chart according to an embodiment.

This process will now be described with reference to FIG. 10.

In step 1000, the node receives a message from another node.

In step 1004, the message handler 232 unwraps the message.

In step 1008, the message processor 240 updates the database 208 using the information in the wrapper.

In decision diamond 1012, the message director 236 determines whether the current node is the final destination for the message.

When the current node is the final destination, the message director selects a message destination. Message destinations include the sensor module 204 for sensor module commands and requests, the message processor 240 for responding to network queries (e.g., get routing lists, get neighbor list, get visibility list, need parent, etc.), responding to network commands (e.g., be parent, set visibility list, add node to visibility list, remove node from visibility list, set terminal mode, reset terminal mode), processing responses to the current node's queries (e.g., need parent, get routing lists, get neighbor list, and get visibility list, etc.), and processing network updates (e.g., parent/child, etc.), and the scheduler 228 for RTS and CTS messages.

When the current node is not the final destination, the message handler 232 performs the acknowledge protocol in step 1016.

In step 1020, the message handler 232 changes the next hop address, in step 1024 wraps the message, and in step 1028 performs the forward message protocol.

Parent/Child Add/Remove Message Protocol

Figure 11:
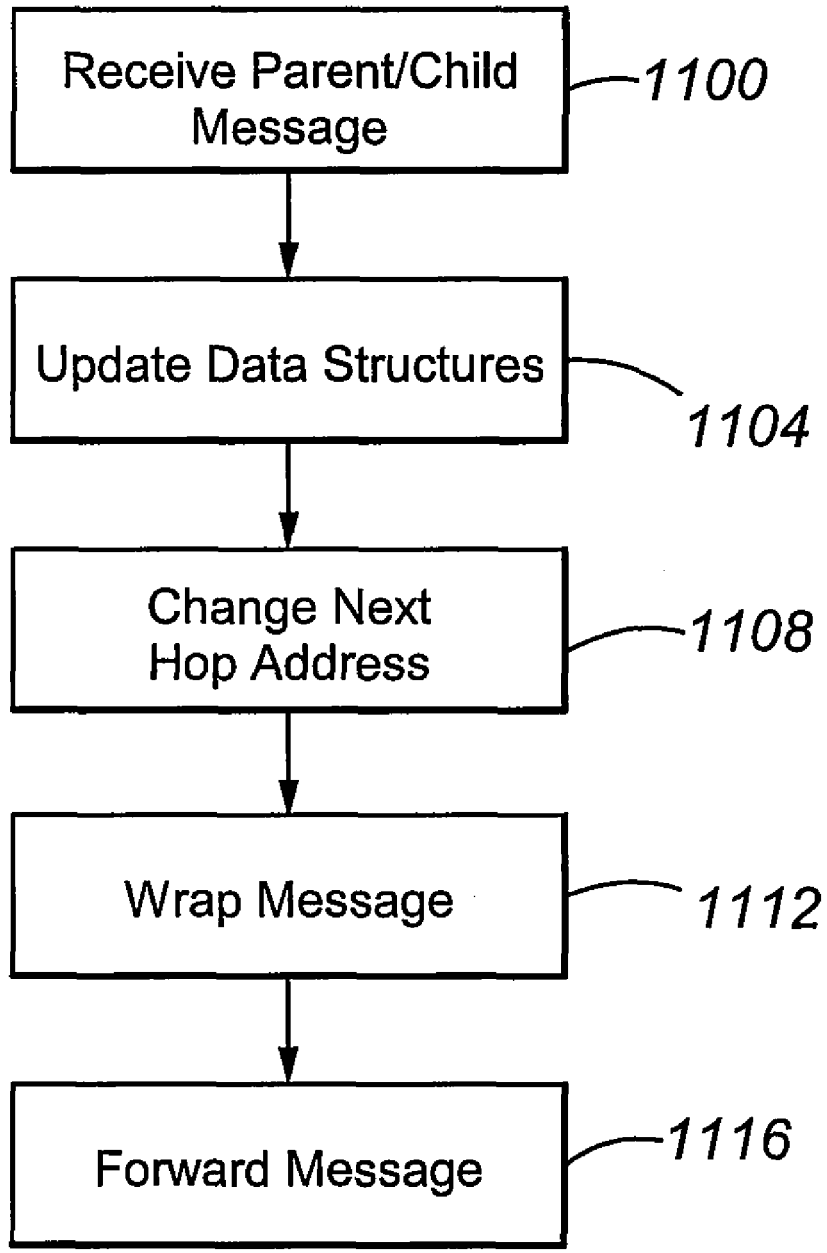
FIG. 11 is a flow chart according to an embodiment.

FIG. 11 depicts the processing of a parent/child message.

In step 1100, a message handler 232 receives a parent/child message.

In step 1104, the message processor 240 updates the local data structures.

In step 1108, the message handler 232 changes the next hop address.

In step 1112, the message handler 232 wraps the message.

In step 1116, the message handler forwards the message.

Operation of the Scheduler

Figure 12:
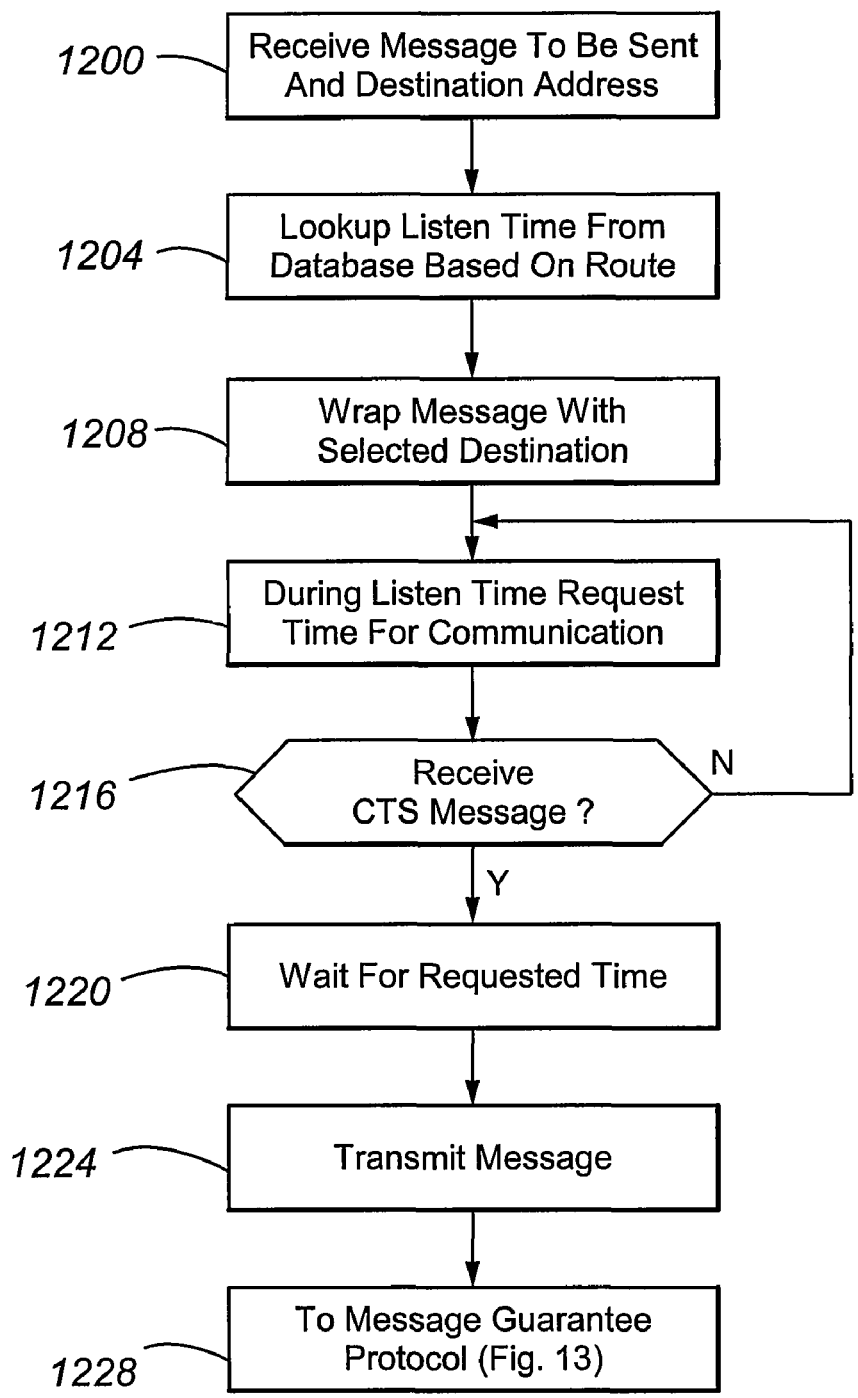
FIG. 12 is a flow chart according to an embodiment.

The operation of the scheduler 228 will now be discussed with reference to FIG. 12.

In step 1200, the scheduler 228 receives a message to be sent and a destination address.

In step 1204, the scheduler 228 looks up the standard listen time for the destination address from the database 208 based on a selected route.

In step 1208, the message handler 232 wraps the message with a selected destination.

In step 1212, the message handler 232, during the standard listen time of the selected destination, requests by an RTS message a time for the message to be sent.

In decision diamond 1216, the scheduler 228 determines whether a CTS message has been received. If not, step 1212 is repeated. If so, the scheduler 228 in step 1220 waits for the requested time set forth in the CTS message.

In step 1224, when the requested time arrives the scheduler 228 causes transmission of the message to the destination.

In step 1228, the message guarantee protocol is performed.

Selection and Addition of New Parent

The post-initialization selection and addition of a new parent will now be discussed with reference to FIG. 16. Prior to discussing FIG. 16, an example will be discussed to illustrate this operation. Assume that sensor node 100*a* is a parent to sensor nodes 100*c* and 100*d*. If node 100*a* stops accepting data messages from either or both of nodes 100*c* and 100*d*, then the impacted node(s) will send out a message to find a new parent, such as node 100*b*.

In FIG. 16, a node, such as node 100*c* or 100*d*, identifies, in step 1600, a stimulus to select a new parent.

In step 1604, the node's message processor 240 applies rules and selects a new potential parent node. This may be multiple steps in which RTS messages are broadcast to neighbors to collect relevant information to effect this selection. Whether or not the first and second data structures are updated depends upon the time lapse since the last updates.

In step 1608, the scheduler 228 determines the potential parent node's next standard listen time.

In step 1612, the scheduler 228 generates and sends a be parent message to the potential parent node.

In decision diamond 1616, the message processor 240 determines if an acknowledge message has been received from the potential parent node. If not, the processor 240 determines in decision diamond 1620 whether a not acknowledge message has been received.

When a not acknowledge message has been received, the message processor 240 returns to and repeats step 1600.

When an acknowledge message has been received, the message processor 240, in step 1624, generates and sends a have parent message to the base node 104.

In next step 1628, the parent node generates and sends a parent/child message.

The exemplary systems and methods of this invention have been described in relation to distributed wireless sensor networks. However, to avoid unnecessarily obscuring the present invention, the preceding description omits a number of known structures and devices. This omission is not to be construed as a limitation of the scope of the claimed invention. Specific details are set forth to provide an understanding of the present invention. It should however be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a sensor node, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example in one alternative embodiment, the systems and methods of this invention can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a protocol embedded in a dedicated measurement system, system component, or the like. The system can also be implemented by physically incorporating the system and/or method into a software and/or hardware system.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for a distributed wireless network including a plurality of sensor nodes, each of the plurality of sensor nodes comprising a radio, the method comprising: providing a listen time for each sensor node, wherein, during the listen time, the radio of the corresponding sensor node is activated and able to receive wireless signals and wherein, during a time other than the listen time, the radio is deactivated and unable to receive wireless signals; transmitting, by a first sensor node, to a second sensor node a first message, the first message comprising a time offset from a transmission time of the message, the time offset indicating a timing of a first listen time for the first sensor node; and in response, scheduling, by the second sensor node, a time to transmit a second message to the first sensor node, the transmit time being based on the time offset, and wherein the first node receives a third message from a third node, wherein a final destination of the third message is a fourth sensor node, wherein the third message comprises a source identifier for a prior hop, the prior hop source identifier being the third node, a target identifier for the prior hop, the prior hop target identifier being the first node, a source identifier for the third message, the source identifier being a fifth node, a target identifier for the third message, the target identifier being the fourth node, a listen time associated with the third node, and further comprising: selecting, by the first node, the second node as a next hop destination for the payload of the third message, the first node being a child of the second node; changing, by the first node, the hop source identifier to the second node, the hop target identifier to the second node, while leaving the final destination and third message source identifier the same to form a revised third message; and transmitting the revised third message to the second node.

2. The method of claim 1, wherein, during a selected time interval, the radio of the first sensor node is deactivated for a longer period of time than the radio is activated, wherein the scheduled time to transmit the second message falls within the second node's estimate of the initiation of the first node's listen time, and wherein the second node's estimate of the initiation of the first node's listen time is offset temporally from the actual initiation of the first node's listen time.

3. The method of claim 2, wherein the temporal offset is related to a time to transmit the first message from the first sensor node to the second sensor node.

4. The method of claim 1, wherein the first and second sensor nodes each comprise data structures containing information respecting network topology and/or configuration, wherein the data structures of the first and second sensor nodes each contain incomplete network topology and/or configuration information, and wherein the network topology and/or configuration information of the first and second sensor nodes is different.

5. The method of claim 1, wherein the first node selects at least one of randomly and pseudo-randomly an initiation time of the first listen time, wherein, after the selection, the first node broadcasts a message to surrounding nodes containing a time offset to the initiation time of the first listen time, and wherein data messages are transmitted, by the first node, at times other than the first listen time.

6. The method of claim 1, wherein a message acknowledgement is sent on a hop-by-hop basis and, when a selected node transmits a selected message and fails to receive a message acknowledging the selected message, the selected node holds the selected message until a network configuration message is received indicating a new routing path to a final destination of the selected message and thereafter transmits the selected message along the new routing path.

7. A non-transitory computer readable medium comprising processor-executable instructions to perform the steps of claim 1.

8. A plurality of sensor nodes in a distributed wireless network including, a first sensor node, comprising: a radio operable to effect wireless communications; a sensor module operable to sense a selected parameter; and a scheduler operable to: select a listen time for the first sensor node, wherein, during the listen time, the radio is activated and able to receive wireless signals and wherein, during a time other than the listen time, the radio is deactivated and unable to receive wireless signals; cause transmission to a second sensor node a first message, the first message comprising a time offset from a transmission time of the first message, the time offset indicating a timing of a first listen time for the first sensor node; and in response, receiving, from the second sensor node, a second message, wherein the time selected by the second sensor node to transmit the second message to the first sensor node is based on the time offset, and wherein the first node receives a third message from a third node, wherein a final destination of the third message is a fourth sensor node, wherein the third message comprises a source identifier for a prior hop, the prior hop source identifier being the third node, a target identifier for the prior hop, the prior hop target identifier being the first node, a source identifier for the third message, the source identifier being a fifth node, a target identifier for the third message, the target identifier being the fourth node, a listen time associated with the third node, and further comprising: a message processor operable to: select, by the first node, the second node as a next hop destination for the payload of the third message, the first node being a child of the second node; change, by the first node, the hop source identifier to the second node, the hop target identifier to the second node, while leaving the final destination and third message source identifier the same to form a revised third message; and transmit the revised third message to the second node.

9. The plurality of sensor nodes of claim 8, wherein, during a selected time interval, the radio of the first sensor node is deactivated for a longer period of time than the radio is activated, wherein the time selected to transmit the second message falls within the second node's estimate of the initiation of the first node's listen time, and wherein the second node's estimate of the initiation of the first node's listen time is offset temporally from the actual initiation of the first node's listen time.

10. The plurality of sensor nodes of claim 9, wherein the temporal offset is related to a time to transmit the first message from the first sensor node to the second sensor node.

11. The plurality of sensor nodes of claim 8, wherein the first and second sensor nodes each comprise data structures containing information respecting network topology and/or configuration, wherein the data structures of the first and second sensor nodes each contain incomplete network topology and/or configuration information, and wherein the network topology and/or configuration information of the first and second sensor nodes is different.

12. The plurality of sensor nodes of claim 8, wherein the first node selects at least one of randomly and pseudo-randomly an initiation time of the first listen time, wherein, after the selection, the first node broadcasts a message to surrounding nodes containing a time offset to the initiation time of the first listen time, and wherein data messages are transmitted, by the first node, at times other than the first listen time.

13. The plurality of sensor nodes of claim 10, wherein a message acknowledgement is sent on a hop-by-hop basis and, when a selected node transmits a selected message and fails to receive a message acknowledging the selected message, the selected node holds the selected message until a network configuration message is received indicating a new routing path to a final destination of the selected message and thereafter transmits the selected message along the new routing path.

* * * * *